United States Patent [19]

Audren et al.

[11] Patent Number: 4,546,292

[45] Date of Patent: Oct. 8, 1985

[54] ELECTRONIC CIRCUIT FOR CONSTANT CHARGE CONTROL OF AN ELECTROSTATIC MOTOR, IN PARTICULAR FOR AN ACCELEROMETER OR A RATE GYRO

[75] Inventors: Jean-Thierry Audren, Les Ulis; Charlie Pelletier, Massy, both of France

[73] Assignee: Societe de Fabrication d'Instruments de Mesure, Massy, France

[21] Appl. No.: 612,151

[22] Filed: May 21, 1984

[30] Foreign Application Priority Data

Jun. 1, 1983 [FR] France ................. 83 09066

[51] Int. Cl.[4] .............................................. H02N 1/00
[52] U.S. Cl. ...................... 318/116; 310/308; 310/309
[58] Field of Search ............... 318/116; 310/307–310; 322/2

[56] References Cited

U.S. PATENT DOCUMENTS

| | | | |
|---|---|---|---|
| 3,094,653 | 6/1963 | Le May et al. | 318/116 X |
| 3,143,671 | 8/1964 | Gale | 310/309 |
| 3,233,157 | 2/1966 | Stockman | 318/111 |
| 3,566,700 | 3/1971 | Staats | 74/5 |
| 3,951,000 | 4/1976 | Ferriss et al. | 318/116 X |
| 4,078,436 | 3/1978 | Staats | 74/5.4 |

Primary Examiner—Donovan F. Duggan
Attorney, Agent, or Firm—Alan H. MacPherson; Steven F. Caserza; Thomas S. MacDonald

[57] ABSTRACT

An electrostatic motor is constituted by a capacitor (10) having relatively movable electrodes (11, 12) separated by a variable gap (13). The control circuit includes a DC source (60) which is servo-controlled to current measurement means (20) and integrator means (30) for calculating the charge on the capacitor plates and for maintaining said charge constant ($Q_0$). By applying servo control to keep the charge constant, the force on the plates is independent of the variable value of the gap (14). The charge is preferably on/off switched with a pulse width modulation ratio that is a function of the force which is to be applied.

6 Claims, 4 Drawing Figures

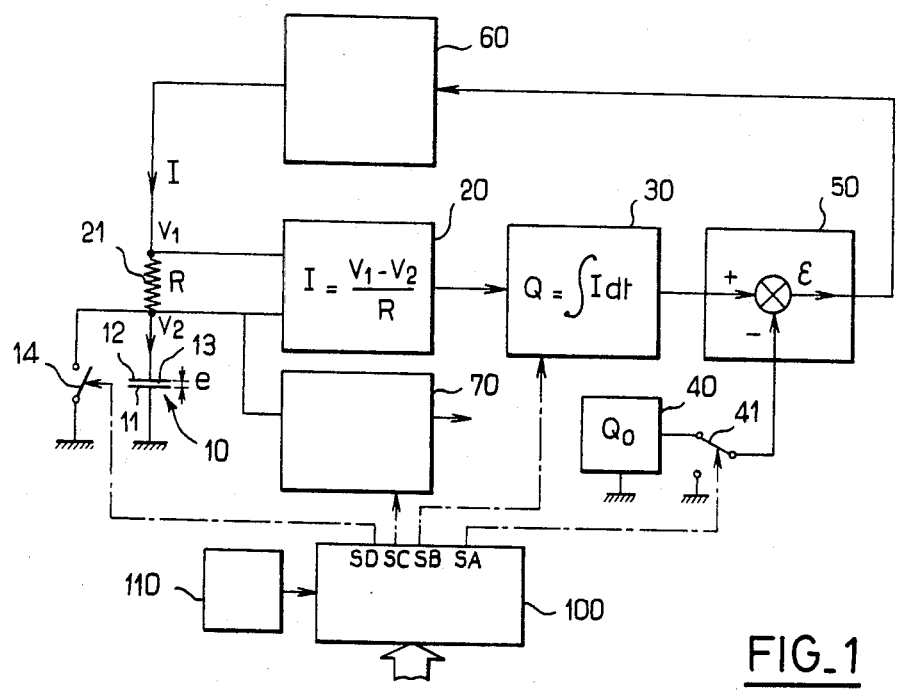
FIG_1
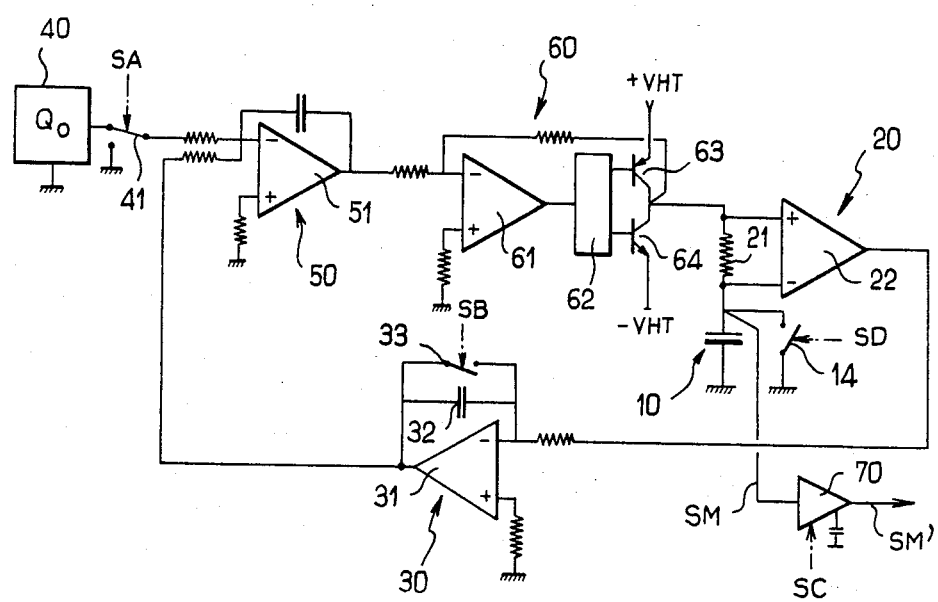
FIG_2

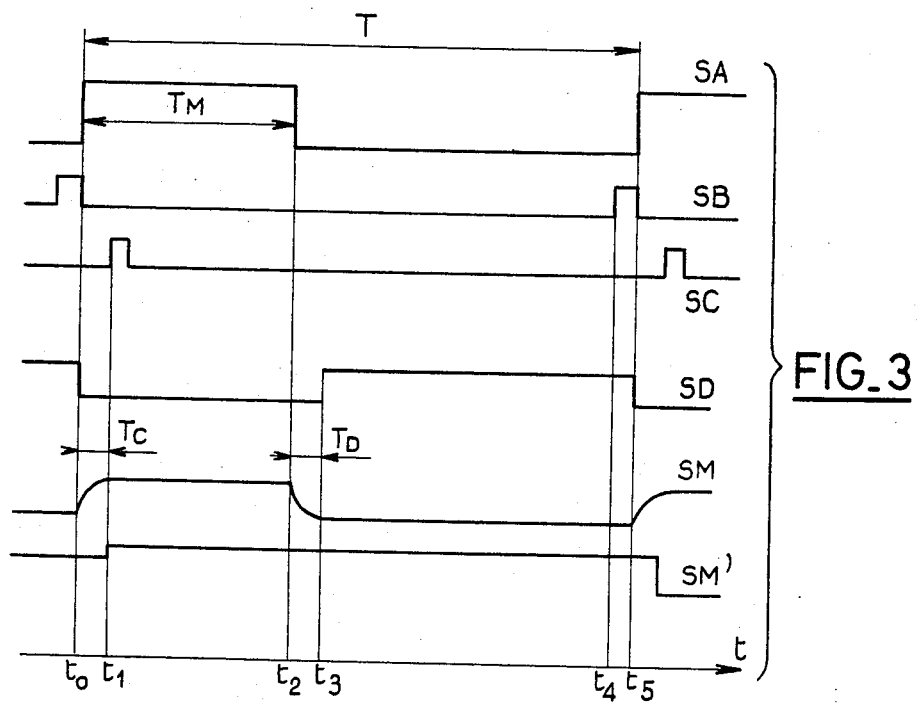
FIG_3
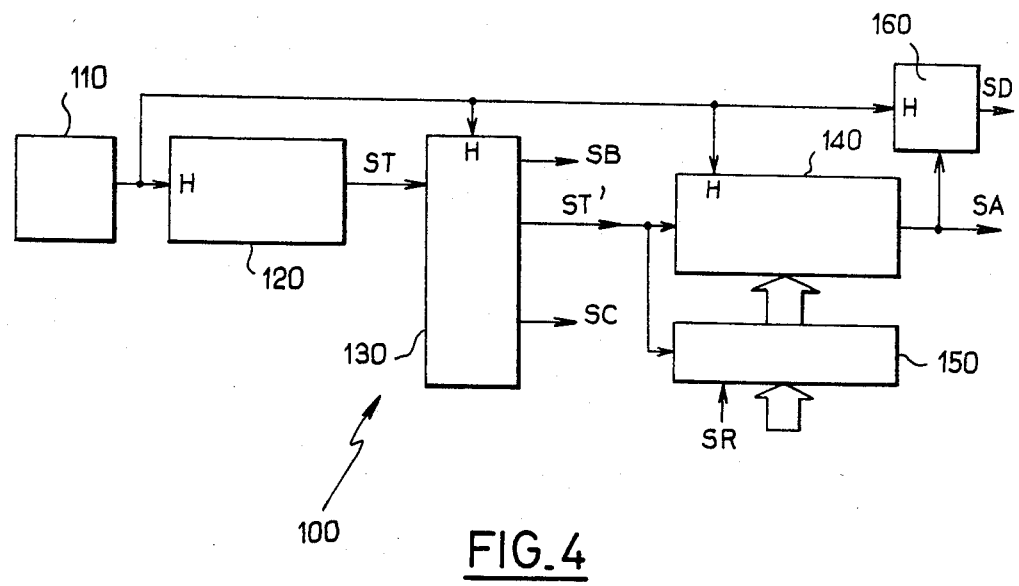
FIG_4

ELECTRONIC CIRCUIT FOR CONSTANT CHARGE CONTROL OF AN ELECTROSTATIC MOTOR, IN PARTICULAR FOR AN ACCELEROMETER OR A RATE GYRO

The present invention relates to an electronic circuit for controlling an electrostatic motor.

BACKGROUND OF THE INVENTION

The term "electrostatic motor" is used herein for any device having a pair of electrodes which are movable relative to each other and which are separated by a gap in such a manner as to constitute a capacitor, the electrodes of the capacitor receiving charges that develop electrostatic forces of attraction or repulsion between the electrodes.

Such electrostatic motors are used in rate gyros, for example, as precession motors for exerting a return torque on a spinning flywheel to return it to a central position. The flywheel constitutes, for example, a moving electrode connected to ground potential, with fixed electrodes being provided in the vicinity of the flywheel to employ the electrostatic effect to exert suitably directed forces thereon to constitute a return torque. The charge received by the fixed electrodes is determined as a function of a force (or torque) reference signal which is itself derived from a position signal indicative of the angle of the flywheel relative to its central position.

This type of rate gyro is described, for example, in the present Assignee's French patent application No. 83-05464. In addition to acting as precession motors, (ie. applying a return torque to a flywheel), electrostatic motors are also used as flywheel lift motors (ie. for applying an axial force to support the weight and oppose accelerations where necessary).

Heretofore, such electrostatic motors have been servo controlled by connection to a constant voltage source. Such a method of control nevertheless suffers from the drawback of developing a force whose magnitude depends on the inter-electrode gap, and thus varies over time since any movement of the moving electrode changes the gap and hence changes the capacitance of the capacitor. The force is given by the expression:

$$F = \frac{\epsilon_0 S}{2e^2} V^2$$

where:
V is the voltage applied to the electrodes,
S is the overlapping area of the electrodes, and
e is the width of the gap.

The effectiveness an electrostatic motor is thus not constant, and depends in particular of the tilt of the flywheel (in the case of a precession motor for a rate gyro). Further, it is generally not possible to directly measure the force as effectively applied, and the apparatus does not lend itself to direct measurement of the gap. Additional position detecting means must thus provided for measuring gap width.

To remedy this drawback, proposals have been made to use a constant current source, for example as in French published patent specification No. 2 241 385, which describes an electrostatic return motor for an accelerometer including a swinging mass. In that case, the measured value of the voltage between the return electrodes includes information concerning the position of the swinging means relative to its rest position.

However, the drawback of a non-linear return force remains.

Preferred embodiments of the present invention remedy these various drawbacks by providing control on the basis of constant charge instead of on the basis of constant current.

The force is then given by the expression:

$$F = \frac{Q^2}{2\epsilon_0 S}$$

where Q is the charge stored in the capacitor.

It will be observed that the gap width e no longer appears in the expression.

SUMMARY OF THE INVENTION

More particularly, the present invention provides a control circuit comprising:

a source of DC voltage applied between the electrodes of the capacitor;

measurement means for measuring the resulting flow of current to the capacitor;

integrator means for integrating the current thus measured to deliver a signal representative of the quantity of charge stored in the capacitor;

comparator means for delivering a difference signal representative of the difference between said measured quantity of charge and a reference signal which is a function of a reference force to be applied; and servo-control means for modifying the value of the DC voltage delivered by the said source of DC voltage in such a manner as to tend to cancel said difference in order to maintain a constant charge on the capacitor while said DC voltage is being applied thereto and regardless of any variations in the capacitance of the capacitor due to variations in the gap between its electrodes.

Preferably, the circuit further includes means for measuring the voltage applied by the source across the electrodes of the capacitor to deliver a signal proportional to the size of the gap between the capacitor electrodes.

When charge is maintained, the voltage V across the terminals is given by the expression:

$$V = \frac{Q}{\epsilon_0 S} e$$

The control voltage V is directly proportional to the gap width e, and may thus be used as a detection signal representative of the angular or linear position of the moving electrode.

In a preferred embodiment, the capacitor is cyclically charged and discharged, with charging being by applying the DC voltage from the source for a variable period, with the voltage thus applied resulting from a constant reference signal, and the duration of the application of the voltage being determined by timing control means as a function of the force reference signal.

The charge on the electrode is known only by integrating the charging current. Given the possibility of leakage currents, the measured value can only be considered accurate for a short period of time. That is why it is preferable to use an on/off constant charge control system in which the force reference signal is used to modulate the length of time $T_M$ for which the charge is maintained on the electrode. If the period of the charge/discharge cycle is designated T, the force applied is given by the expression:

$$F = \left(\frac{1}{\epsilon_0 S} Q_O^2\right) \frac{T_M}{T}$$

where $Q_O$ is the value of the constant charge applied to the electrode for duration $T_M$.

The force is thus directly proportional to the modulation ratio applied to the pulse signal representative of the charge on the capacitor. This feature has two advantages: firstly it linearizes the scale factor; and secondly it avoids long-term drift which would otherwise be a problem if a constant charge were to be applied permanently.

Preferably, the capacitor is discharged by substituting a zero signal for the constant reference signal, the instant of substitution being determined by the timing control means.

In this manner the real charge on the capacitor is the image of the reference signal which is a pulsed signal; ie. constant, then zero, then constant, etc.

It is advantageous to avoid possible side-effects due to the charging and discharging transients of the capacitor, ie. to avoid measurement and control errors which could stem from the time taken to charge and to discharge the capacitor.

Thus, the control circuit may further include discharge-confirming means which are triggered by the timing control means to short-circuit the capacitor after a delay relative to the instant at which the zero signal is substituted for the constant reference signal, the duration of the delay being substantially equal to the average transient period required by the capacitor to discharge to zero voltage across its terminals.

The control circuit may also include measurement means for measuring the voltage applied by the source across the electrodes of the capacitor, said measurement means remaining inhibited from the beginning of the period at which the source voltage is applied for a period substantially equal to the average transient time required to establish a constant charge on the capacitor electrodes.

Possibly damaging side-effects due to the rising and falling edges of the charge pulse on the capacitor are thus avoided, and the voltage on the capacitor (representative of the width of the inter-electrode gap) is measured only once stable conditions have been reached, ie. on the basis of genuinely square pulses.

BRIEF DESCRIPTION OF THE DRAWINGS

An embodiment of the invention is described by way of example, with reference to the accompanying drawings, in which:

FIG. 1 is a block diagram for explaining the operation of the control circuit;

FIG. 2 is a circuit diagram of a particular embodiment of the FIG. 1 block diagram;

FIG. 3 is a waveform diagram showing various signals in the circuit; and

FIG. 4 is a block diagram of the various components of the timing control circuit shown in FIG. 1.

MORE DETAILED DESCRIPTION

In FIG. 1, an electrostatic motor 10 is represented as a capacitor having two electrodes 11 and 12 which are separated by a gap 13 of width e. The electrode 11, for example, is fixed and is electrically grounded, while the electrode 12 is a moving electrode to which a voltage $V_2$ is applied from a source 60.

The current I which passes from the source 60 to the electrode 12 is measured by a circuit 20, for example by measuring the potential difference $V_1 - V_2$ across the terminals of a series resistor 21 of resistance R.

The signal representative of the current intensity at the output from the circuit 20 is then integrated by a circuit 20, thereby determining the total quantity Q of electrical charge which has been applied to the capacitor by said current.

The value of charge Q is then compared with a constant reference value $Q_O$ delivered by a charge reference circuit 40. The comparison is performed by a circuit 50 in such a manner as to obtain an error signal for use in servo control of the source 60 in such a direction as to cancel the error.

The source is thus controlled in such a manner that the quantity of electrical charge accumulated on the capacitor reaches the reference value $Q_O$, and is then maintained at this value.

A circuit 70 is also provided for measuring the voltage reached under steady charge conditions across the terminals of the capacitor, which measured voltage can be used to derive the width of the gap e.

A timing control circuit 100 is driven by a clock 110 and produces a series of signals SA, SB, SC, and SD for controlling the circuit in a manner which is described below, and in particular for controlling a discharge-confirming switch 14 for periodically short-circuiting the capacitor, and a changeover switch 41 for periodically substituting a zero value instead of the charge reference value $Q_O$ to discharge the capacitor.

FIG. 2 shows a particular embodiment of the FIG. 1 circuit, except that the timing control circuit 100 has been omitted and is described in greater detail with reference to FIG. 4. The current measuring circuit 20 comprises an operational amplifier 22 which measures the voltage across the terminals of the resistor 21 connected in series with the capacitor 10. The output signal from the amplifier is fed to the inverting input of an operational amplifier 51 connected as an integrator which constitutes the charge-determining circuit 30. The output signal from the integrator is then applied to an error-cancelling stage 50 which comprises an operational amplifier 51 which is also connected as an integrator. This amplifier 51 also receives the charge reference value $Q_O$ as produced by a stabilized voltage source 40 and as applied via the switch 41.

The output signal from the amplifier 51 drives the voltage source 60 which is constituted by a high tension amplifier 60 including an operational amplifier 51 connected via suitable driver circuits 62 to drive a pair of complementary transistors 63 and 64 which are connected between symmetrical voltages +VHT and −VHT. The voltage at the mid point between the transistors 63 and 64 serves as the voltage source for application to the capacitor 10.

In addition to the above-mentioned changeover switch 41 for cancelling the charge reference voltage $Q_O$ under the control of the signal SA, there is also a switch 33 for resetting the integrator 30 to zero by short-circuiting its integrating capacitor 32 under the control of the signal SB, and the discharge-confirming switch 14 for short-circuiting the electrodes of the electrostatic motor 10 under the control of a pulse SD.

Further, the measurement signal SM representing the voltage at the terminals of the capacitor 10 is measured by a sample-and-hold circuit 70 under the control of the signal SC. The output signal from the sample-and-hold circuit 70 is referenced SM'.

The operation of this circuit is described with particular reference to FIG. 3 which is a waveform diagram showing the various signals mentioned with reference to FIG. 2.

At instant $t_O$, the switch 41 (under the control of the signal SA) applies a constant voltage representative of a charge reference signal $Q_O$ to the input of the error cancelling integrator 51. The switch is kept in this position for a period $T_M$ until an instant $t_2$.

As a result, the charge on the electrostatic motor rises (the signal SM represents the voltage across the terminals of the motor), and the reference voltage is reached at instant $t_1$ after a period $T_C$ corresponding to a transient period of capacitor charging, and thus to a transient period in the operation of the negative feedback in the servo control of the DC source.

At the instant $t_2$, the switch 41 changes over and thus connects a zero reference value in the place of the charge reference value $Q_O$.

The voltage across the terminals of the electrostatic motor then falls until it reaches a zero value at the instant $t_3$ with a period of duration $T_D$ corresponding to the capacitor discharge time constant and constituting a transient period in the operation of the negative feedback in the servo control of the DC source.

The zero charge is then maintained until an instant $t_5$ when the cycle restarts.

A little before the instant $t_5$, a signal SB initializes the integrator 30 at an instant $t_4$. This signal ensures that the charge calculating circuit which drives the DC source is reset to zero.

It will also be observed that the sample-and-hold circuit is triggered by a signal SC which is emitted at the instant $t_1$, ie. slightly later than the instant $t_O$ so as to eliminate the effects of capacitor charge rise time (the resulting signal SM' is updated at $t_1$).

Finally, it will be observed that the discharge-confirming switch 14 is controlled by a signal SD at instant $t_3$, and thus with a slight delay which corresponds to the capacitor discharging time.

FIG. 4 is a block diagram of the timing control circuit 100 which is driven by the clock 110 and which serves to synchronize the operation of the various components.

The timing circuit comprises a divider 120 which divides the clock signal H to to produce a signal ST having a period T which is applied to a circuit 130 including a shift register and a combinatorial logic to produce the signals SB and SC for initializing the integrator and for controlling the sample-and-hold circuit, together with a signal ST' which causes a down counter 140 to be loaded for generating the signal SA under the control of a locked memory 150 which stores the value of the modulation ratio which is defined as a function of the force reference signal. This memory is periodically refreshed (unlocking signal SR), for example whenever the reference value of the force is to be changed. The signal SD for confirming discharge is obtained by shifting the force SA in a circuit 160.

We claim:

1. A control circuit for controlling an electrostatic motor in the form of a capacitor including first and second relatively movable electrodes with a gap between said electrodes, the control circuit controlling the force applied between said motor electrodes as a function of a force reference signal, wherein the control circuit comprises:

a source of DC voltage applied between the electrodes of the capacitor;

measurement means for measuring the resulting flow of current to the capacitor;

integrator means for integrating the current thus measured to deliver a signal representative of the quantity of charge stored in the capacitor;

comparator means for delivering an error signal representative of the difference between said measured quantity of charge and a reference signal which is a function of the said force reference signal; and servo-control means for modifying the value of the DC voltage delivered by the said source of DC voltage in such a manner as to tend to cancel said error in order to maintain the constant charge on the capacitor while said DC voltage is being applied thereto and regardless of any variations in the capacitance of the capacitor due to variations in the gap between its electrodes.

2. A control circuit according to claim 1, further comprising means for measuring the voltage applied by the source across the electrodes of the capacitor to deliver a signal proportional to the size of the gap between the capacitor electrodes.

3. A control circuit according to claim 1, wherein the capacitor is cyclically charged and discharged, with charging being by applying the DC voltage from the source for a variable period ($T_M$), with the voltage thus applied resulting from a constant reference signal ($Q_O$), and the duration of the application of the voltage being determined by timing control means as a function of the force reference signal.

4. A control circuit according to claim 3, wherein the capacitor is discharged by substituting a zero signal for the constant reference signal, the instant of substitution being determined by the timing control means.

5. A control circuit according to claim 4, further including discharge-confirming means triggered by the timing control means to short circuit the capacitor after a delay relative to the instant at which the zero signal is substituted for the constant reference signal, the duration of the delay ($T_D$) being substantially equal to the average treatment period required by the capacitor to discharge until zero voltage appears across its terminals.

6. A control circuit according to claim 3 or 5, further including measurement means for measuring the voltage applied by the source across the electrodes of the capacitor, said measurement means remaining inhibited from the beginning of the period at which the source voltage is applied to the capacitor for a period substantially equal to the average transient period required for a constant charge to be established on the capacitor electrodes.

* * * * *